J. F. HUNTER.
SHOCKER ATTACHMENT.
APPLICATION FILED APR. 18, 1911.
1,020,425.
Patented Mar. 19, 1912.
3 SHEETS—SHEET 1.
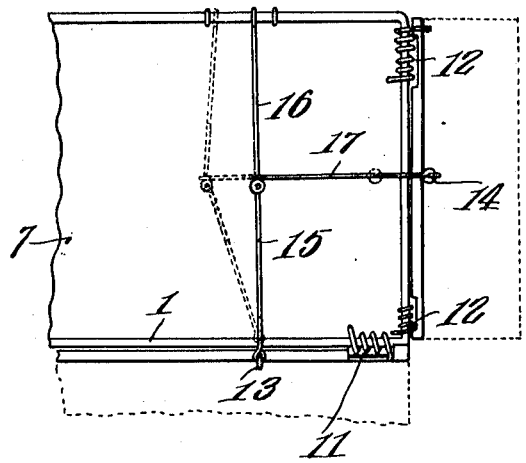
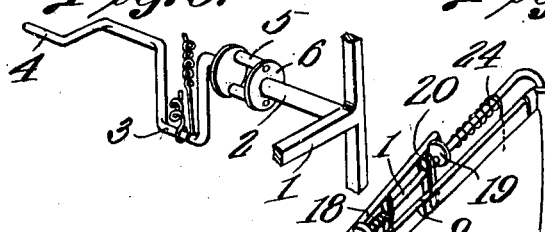
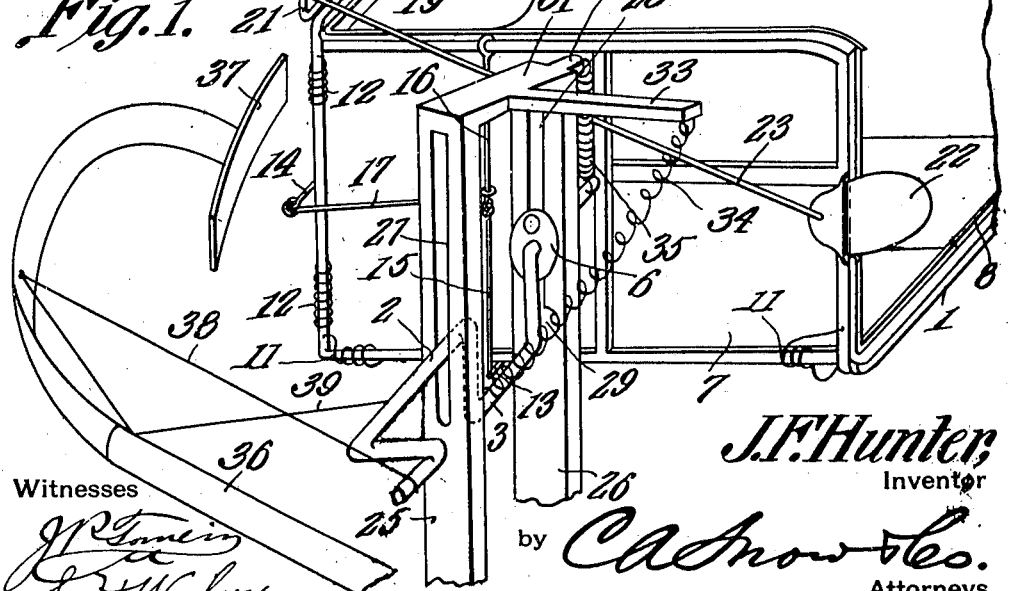
J. F. Hunter,
Inventor
Witnesses
by C. A. Snow & Co.
Attorneys J. F. HUNTER.
SHOCKER ATTACHMENT.
APPLICATION FILED APR. 18, 1911.
1,020,425.
Patented Mar. 19, 1912.
3 SHEETS—SHEET 2.
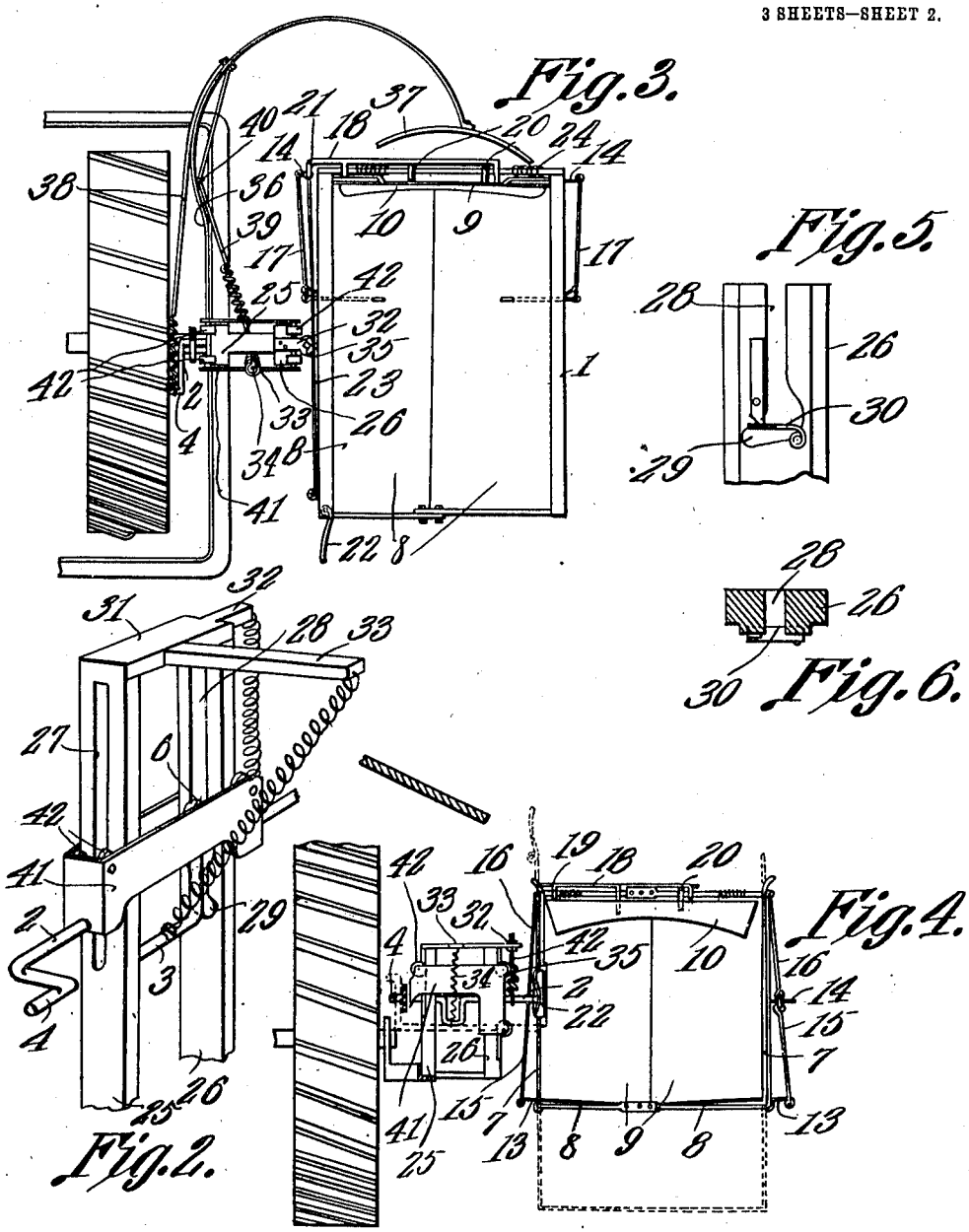
Witnesses
J. F. Hunter,
Inventor
by C. A. Snow & Co.
Attorneys

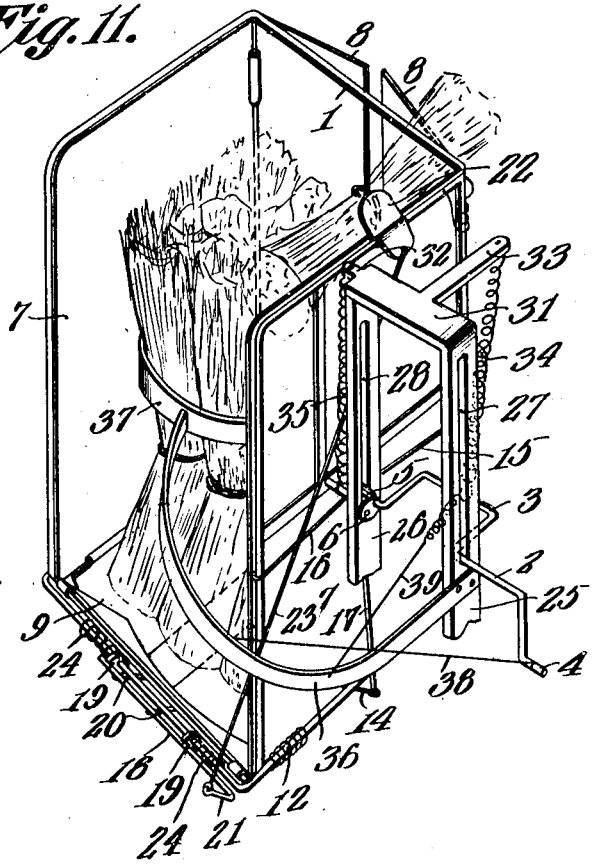

UNITED STATES PATENT OFFICE.

JAMES FOREST HUNTER, OF SIOUX RAPIDS, IOWA.

SHOCKER ATTACHMENT.

1,020,425.   Specification of Letters Patent.   Patented Mar. 19, 1912.

Application filed April 18, 1911. Serial No. 621,918.

*To all whom it may concern:*

Be it known that I, JAMES F. HUNTER, a citizen of the United States, residing at Sioux Rapids, in the county of Buena Vista and State of Iowa, have invented a new and useful Shocker Attachment, of which the following is a specification.

This invention has relation to shocker attachments for grain harvesters and consists in the novel construction and arrangement of its parts as hereinafter shown and described.

The object of the invention is to provide an attachment of simple form which may be quickly and easily applied to the frame of a harvester at the delivery edge of the grain deck thereof, the parts being so arranged that the shocker will accumulate a number of bundles and gradually gravitate to lower the bundles to the ground. At the same time means is provided for turning the shock receptacle so that the shock will be positioned on end above the ground. After the shock has been positioned upon the ground means which normally holds hinged side panels of the shock receptacle in closed positions is operated whereby the said panels are free to swing open to permit the liberation of the shock. At the same time the bundle which operates the locking or trip mechanism above indicated is deposited upon the top of the shock and becomes cap bundle thereof. After the shock has been deposited upon the ground in the manner indicated, means is provided for returning the parts of the attachment to their normal positions.

In the accompanying drawings:—Figure 1 is a perspective view of the shocker attachment with parts removed. Fig. 2 is a detail perspective view of a portion of the shocker attachment. Fig. 3 is a top plan view of the shocker attachment showing the same applied to the frame of a harvester. Fig. 4 is a rear elevation of the attachment applied to the frame of a harvester. Fig. 5 is a side elevation of a portion of a standard used in the attachment. Fig. 6 is a transverse sectional view of said standard. Fig. 7 is a detail side elevation of a portion of the shock receptacle. Fig. 8 is a perspective view of a crank shaft forming a part of the shocker attachment. Fig. 9 is a perspective view of a trip mechanism forming a part of the attachment. Fig. 10 is a sectional view of shaft sections forming a part of the crank shaft shown in Fig. 8. Fig. 11 is a perspective view of the receptacle in tilted position in the first stage of the depositing of the shock upon the ground, the shock being shown in phantom and the capping sheaf being also shown in phantom passing over the trip arm.

The attachment includes a receptacle embodying a frame 1 having side partitions 7 the top and rear being open. A shaft 2 projects from one side of the receptacle and is provided at a point intermediate its ends with a crank 3 and at one of its ends a crank extremity 4. Spaced stub shafts 5 form sections of the shaft 2 and are held in proper relation with respect to each other by means of head plates 6 mounted upon the intermediate portion of the said shaft 2.

The sides of the receptacle are closed by partitions 7, as stated, and the bottom of the receptacle is normally closed by hinged panels 8. One end, or the front of the receptacle, is normally closed by hinged panels 9 and a flap or chute plate 10 is hingedly mounted at that end of the receptacle at which the panels 9 are located and normally overlaps the upper edge portions of the said panels 9. The panels 8 are normally held in closed positions by springs 11 which are mounted upon the end portions of the frame 1 and bear against the under sides of the panels 8 to hold them in closed position. The panels 9 are normally held in closed position by means of springs 12 which surround the end portions of the frame structure 1 and bear against the front sides of the said panels 9 and 10 to hold them in closed position. The panels 8 are provided with arms 13 which project outwardly beyond the hinged edge portions of the said panels and the panels 9 are provided with arms 14 which project outwardly beyond the hinged edge portion of said panels 9. Rods 15 and 16 are pivotally connected together at their inner ends and the rods 15 at their lower ends are pivotally connected with the outer ends of the arms 13. The rods 16 at their upper ends are pivotally connected with the frame 1 of the receptacle. Rods 17 are pivotally connected at their front ends with the arms 14 and at their rear ends with the intermediate portion of either the rods 15 or 16.

As shown in Fig. 7 the connection between the rods 16 and 17 is made. A shaft 18 is provided with bearings 19 which loosely receive the upper end portion of the frame 1 and the shaft 18 is provided with arms 20 which normally lie against the outer side of the panels 9. The shaft 18 is provided at one end with a crank extremity 21 and a trip arm 22 is pivotally mounted upon that end of the frame 1 opposite that end thereof at which the shaft 18 is carried. A rod 23 operatively connects the trip arm 22 with the crank extremity 21 of the shaft 18, the trip arm and the rod 23 being normally swung past dead center against the side of the receptacle to lock the panels 8 and 9 in position. Springs 24 surround an end portion of the frame 1 and bear at one end against the under side of the apron 10 and have a tendency to hold the free edge portion of the said apron away from the inner surfaces of the panels 9. Standards 25 and 26 are mounted upon the frame of the harvester and the standard 25 is provided with an elongated slot 27 which receives one portion of the shaft 2 while the standard 26 is provided with an elongated slot 28 which receives another portion of the said shaft, the slot 28 at its lower extremity being provided with a laterally disposed portion 29 across which extends a spring 30 against which the shaft sections 5 will bear when the shock receptacle is in its lowermost position the said spring serving as means to break the force of the shock as the receptacle moves to its lowermost position, and also serving as means to assist in the return of the shock receptacle to its normal position after the shock has been deposited. The intermediate crank portion 3 of the shaft 2 is located between the standards 25 and 26. At their upper ends the said standards 25 and 26 are connected together by means of a cross piece 31 having at one end an arm 32 and at its side an arm 33. A coil spring 34 is connected at its upper end with the extremity of the arm 33 and at its lower end with the intermediate crank portion 3 of the shaft 2 to swing the receptacle when lowered. A coil spring 35 is connected at its upper end with the arm 32 and at its lower end with the intermediate portion of the shaft 2 and is under tension with a tendency to hold the said shaft and its attached parts in elevated position thereby returning the receptacle to normal position after the shock has been deposited on the ground. The tendency of the spring 34 is to turn the shaft 2 upon its axis when the said shaft is lowered and the shaft sections 5 enter the laterally disposed portion 29 of the slot 28 in the standard 26. A resilient arm 36 is attached to the standard 25 and extends forwardly beyond the receptacle of which the sides 7 and the panels 8 and 9 form component parts. At its forward end the arm 36 is provided with a plate 37.

A cable 38 is connected with the forward portion of the resilient arm 36 and at its rear end is connected with the crank 4 of the shaft 2. A cable 39 is also connected with the forward portion of the resilient arm 36 and is trained through an eye 40 carried by the said arm and the rear portion of the said cable 39 is connected with the intermediate crank 3 of the shaft 2. The shaft 2 is journaled for rotation in a carriage 41 which is provided at its ends with wheels 42 which bear against the outer sides of the standards 25 and 26.

The operation of the shocker attachment is as follows. Presuming that the parts are in the positions as illustrated in Fig. 1 of the drawings, the said positions being the normal positions of the parts. The bundles of grain as they fall from the delivery end of the grain deck of the harvester enter the receptacle between the sides 7 thereof and rest upon the hinged bottom panel 8. As the bundles accumulate in the receptacle the spring 35 will lengthen under the weight of the grain and the shaft 2 together with the carriage 41 move downwardly along the standards 25 and 26. When the shaft sections 5 arrive at the laterally disposed portion 29 of the slot 28 in the standard 26, assisted by the tension of the spring 34 which is connected with the intermediate crank portion 3, the said shaft and receptacle are turned upon the axis of the shaft whereby the bottom panels 8 of the receptacle are swung to vertical positions and the end panels 9 are swung to approximately horizontal positions. When this is done the bundles in the receptacle are turned from horizontal to vertical position, but inasmuch as some of the bundles will rest upon the hinged flap 10 the panels 9 are relieved of a great portion of the weight of the bundles.

By reason of the fact that the receptacle descends at the time it is turned the trip arm 22 will be carried into position just below the delivery edge of the grain deck of the harvester. Consequently when the next bundle is completed and it is ejected from the harvester it strikes the trip arm 22 and swings the same upon its hinged connection with the frame 1 outwardly beyond dead center. This will permit the rod 23 to move longitudinally which in turn will permit the shaft 18 to rotate and the arms 20 will be forced away from the surface which is now the lowermost surface of one of the hinged panels 9 by the weight of the bundles of grain. Therefore the said panels are free to swing apart at their inner edge portions, and the apron 10 will swing down under the weight of the grain held within the receptacle. Thus the bundles constituting the shock are deposited upon end at the surface of the ground and the final bundle which is cast against the trip arm 22 is deposited on top of the shock and forms the cap bundle thereof. When the panels 9 swing to open positions the arms 14 are swung about the hinged pivots of the said panels which in turn move the rods 17 longitudinally and the rods 15 and 16 are swung out of alinement with each other into the position substantially as shown in Fig. 7 of the drawings. Inasmuch as the rod 16 is confined at one end by a pivotal connection with a portion of the frame 1 and at its lower end is pivotally connected with the rod 15 and in view of the fact that the said rod 15 is connected with the arm 13 the arm 13 will be swung so that the bottom panels 8 will be swung open against the tension of the springs 11. It is to be understood that the panels 9 when swung to open positions are swung against the tension of the springs 12. Therefore as the panels open from each other there is sufficient space between the inner ends thereof to permit the said panels to sweep along the sides of the shock as the machine and shocker pass beyond the same. At the time that the shaft 2 rotates and is lowered the cables 38 and 39 connected with the crank portions of the said shaft have a tendency to pull the forward portion of the resilient arm 36 rearwardly so that the plate 37 is in close proximity to the side of the shock and therefore the shock cannot tilt or fall in a forward direction but is held by the said plate 37 so that it is squarely deposited at the bases of the bundles upon the surface of the ground.

After the bundles have been deposited upon the ground in the manner as indicated the tension of the springs 11 and 12 comes into play and the panels 8 and 9 are closed. At the same time the said panels are relieved of weight and the tension of the spring 35 comes into play which elevates the shaft 2 in the slots 27 and 28 of the standard 26 and the rod 23 assumes substantial alinement with the trip arm 22 or swings past dead center whereby the panels 9 and 8 are held locked in closed positions.

It will be noted that prior to the capping sheaf striking the trip arm 22, the rod 23 and the trip arm being in alinement or beyond dead center against the side of the receptacle will retain the panels 9 in position against swinging outwardly, and necessarily the rod 17 connected to the rods 16 and 15 will prevent the panels 8 from swinging. Thus the respective panels 8 and 9 are retained in position until the capping sheaf strikes the trip arm 22 to swing the said trip arm and the rod 23 outwardly beyond the dead center whereupon the panels are free to swing outwardly by virtue of the weight of the shock to deposit the shock upon the ground. Upon the shock passing out of the receptacle and the weight thereof being relieved from the panels 8 and 9, the said panels are again free to return to normal position by reason of the tension of the springs 11 and 12, and the shaft 18 may be rotated to return the rod 23 and the trip 22 to normal position. It will be noted that upon the panels 9 swinging outwardly to deposit the shock upon the ground, that the rods 17 are moved to break the joints between the rods 15 and 16 thereby permitting the panels 8 to open at the same time with the panels 9.

Having described the invention what I claim as new and desire to secure by Letters Patent is:—

1. A shocker attachment comprising standards adapted to be mounted upon the frame of a harvester, a receptacle resiliently supported upon said standards, means for tilting said receptacle when it arrives at a lowermost position, hinged panels forming the bottom and an end for the receptacle, means for resiliently holding the panels in closed positions, a trip arm pivotally mounted upon the receptacle, a locking device operatively connected with the trip arm and engaging the hinged panels, means operatively connecting the panels together to cause them to swing to open positions simultaneously.

2. A shocker attachment comprising standards, a receptacle resiliently supported upon the standards, means for tilting the receptacle when it assumes a lowered position, hinged panels forming the bottom and an end of the receptacle, means connecting said panels together to cause them to open and close simultaneously, a trip arm pivotally mounted upon the receptacle and a locking device operatively connected with said trip arm and engaging the panels to hold them closed.

3. A shocker attachment comprising standards, a receptacle resiliently supported upon the standards, means for tilting the receptacle when it assumes a lowered position, hinged panels forming the bottom and an end of the receptacle, means operatively connecting the panels together to cause them to open and close simultaneously, a trip arm pivotally mounted upon the receptacle, a locking device operatively connected with the trip arm and engaging the panels to hold them in closed positions, and a resiliently supported apron pivoted in the receptacle against the inner sides of the end panels.

4. A shocker attachment comprising standards adapted to be applied to the frame of a harvester, a receptacle resiliently supported upon the standards, means for tilting the receptacle as it assumes a lowered position, hinged panels forming the bottom and an end of the receptacle, means operatively connecting the panels together to cause them to open and close simultaneously, a trip arm pivoted upon the receptacle, a locking device mounted upon the receptacle and operatively connected with the trip arm and adapted to engage the panels to hold the same in closed positions, a resilient arm supported upon the attachment and having a buffer plate disposed toward the delivery side of the receptacle and means for moving the said arm and plate toward the delivery side of the receptacle when the receptacle assumes a lowered position.

In testimony that I claim the foregoing as my own, I have hereto affixed my signature in the presence of two witnesses.

JAMES FOREST HUNTER.

Witnesses:
JOHN W. FEIOCK,
DAVID AFFULTER.